United States Patent [19]
Chapman et al.

[11] 3,908,219
[45] Sept. 30, 1975

[54] WALK ABOUT WASHING APPARATUS

[76] Inventors: Paul W. Chapman, Rt. 2, Ozark, Mo. 65721; Richard M. Graves, 1821 N.E. Schuyler, Portland, Oreg. 97212; Henry C. Sasse, III, 6595 S.W. Lombard, Beaverton, Oreg. 97005

[22] Filed: Feb. 8, 1974

[21] Appl. No.: 440,849

[52] U.S. Cl. ............... 15/21 D; 15/21 E; 15/DIG. 2
[51] Int. Cl.² ............................................. B60S 3/06
[58] Field of Search ............ 15/DIG. 2, 21 D, 21 E, 15/53, 97

[56] References Cited
UNITED STATES PATENTS

| | | | |
|---|---|---|---|
| 3,271,803 | 9/1966 | Cirino et al. | 15/21 E |
| 3,568,231 | 3/1971 | Carroll | 15/21 D |
| 3,783,466 | 1/1974 | Bernardi | 15/21 E |
| 3,822,430 | 7/1974 | Larson | 15/21 R |

*Primary Examiner*—Edward L. Roberts
*Attorney, Agent, or Firm*—Kolisch, Hartwell, Dickinson & Stuart

[57] ABSTRACT

A vehicle washing apparatus of the type wherein a vehicle travels through the apparatus. The apparatus features an upright rotary brush mounted on a rigid swing arm structure which is pivoted on a reciprocable carriage that can be shifted back and forth a limited distance along a track substantially paralleling the path along which a vehicle moves. Swinging of the arm structure and brush results chiefly from engagement between the brush and the end and lateral sides of a moving vehicle. Shifting of the carriage occurs under power through the operation of a reversible motor whose driving direction is determined, according to the invention, by the angular position of the arm structure and brush.

10 Claims, 4 Drawing Figures

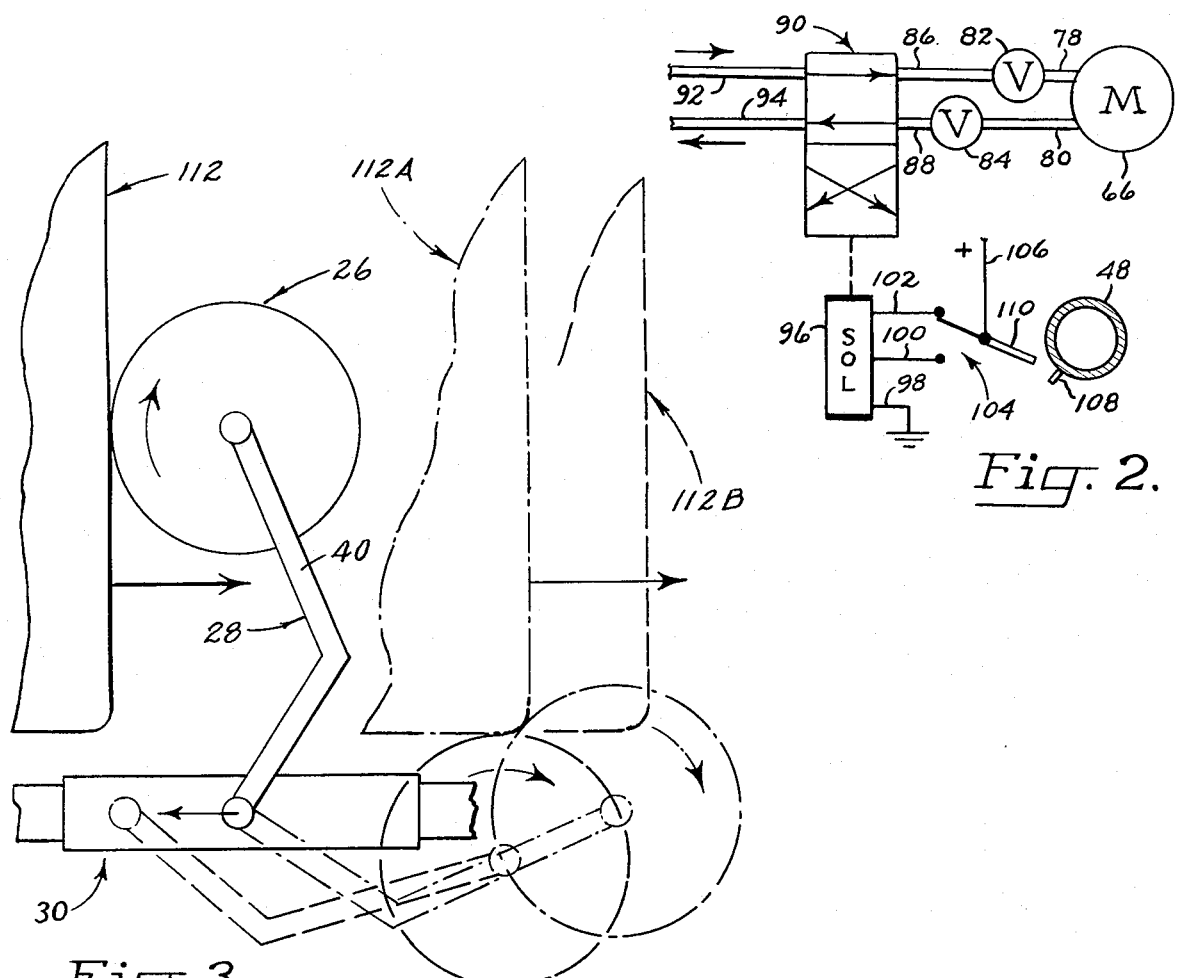
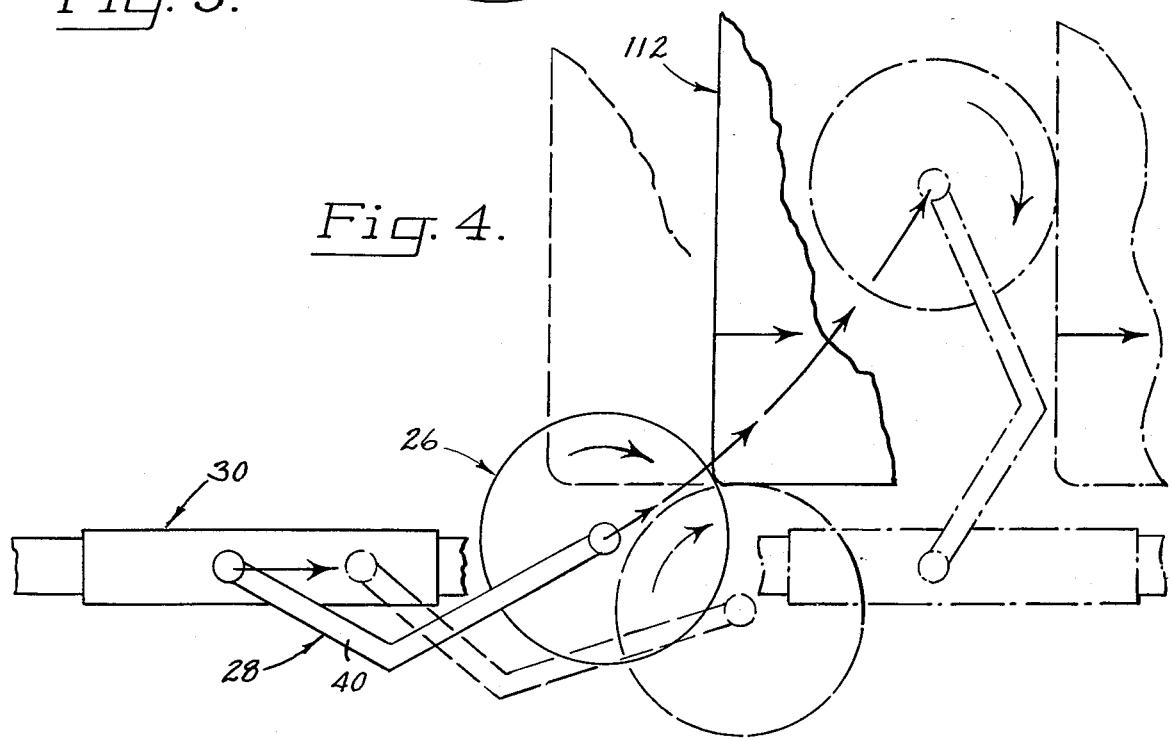

WALK ABOUT WASHING APPARATUS

BACKGROUND AND SUMMARY OF THE INVENTION

This invention pertains to apparatus for washing an article, such as a truck, or other vehicle, or the like. More particularly, it concerns such apparatus wherein the article that is to be washed moves along through the apparatus during a washing operation, either under its own power, or under the influence of a suitable conveyor.

Featured in the apparatus of the invention is a unique assembly for washing the different sides of a moving article, which assembly includes an upright rotary brush specially mounted for compound horizontal movement, including reversible swinging toward and away from the path of travel of the article, and reversible translation along a line substantially paralleling such path. Such an assembly is referred to herein as a "walk-about" washing assembly, because of the ability of the brush in the assembly to "walk" in a multidirectional fashion about the sides of an article, thus to be able to scrub portions of both the end and lateral sides of the article.

According to a preferred embodiment of the invention, the proposed apparatus includes an upright rotary brush, as mentioned above, mounted on a rigid swing arm structure which is pivoted on a reciprocable carriage that can be shifted back and forth a limited distance along a track substantially paralleling the path along which an article to be washed moves. Swinging of the arm structure and brush results principally from engagement between the rotating brush and the sides of a moving article. Shifting of the carriage along the track occurs under power through the operation of a reversible motor whose driving direction is determined and controlled by the angular position of the swing arm structure and brush. In this latter respect, a sensor in the apparatus senses the angular position of the swing arm structure, and "tells" the motor (just mentioned) in what direction to operate.

With respect to the brush in a given washing apparatus or assembly of the type just outlined, and the mounting for such brush, at the beginning of a washing operation the brush is substantially centered on the path of an oncoming article, with the carriage which is associated with the brush located at its extreme downstream position along the track supporting it. As the front end side of an article strikes the brush, the combination of the oncoming movement of the article, and the rotation of the brush, causes the brush to swing away from the travel path, working its way across the near half of the front end side of the article.

On the brush reaching the near front corner of the article, the angular position of its swing arm structure is such that the sensor referred to above instructs the carriage drive motor to shift the carriage at a first selected speed upstream along the track (in the direction opposite the travel direction of the article). With such movement, the brush then works its way along the near lateral side of the article. Should the carriage reach its limit of travel upstream along the track before the brush has completely worked its way along the side of the article, the carriage simply stops along the track, and the brush continues to work at a fixed location in the apparatus until it becomes juxtaposed with the near rear corner of the article.

On the latter event occurring, and because of the direction of rotation of the brush (which will be identified below), the brush begins to swing inwardly toward the travel path, thus to begin to work its way across the near half of the rear end side of the article. With a slight amount of inward swinging in the swing arm structure for the brush, its angular position becomes such that the sensor then instructs the carriage drive motor to return the carriage downstream along the track at another selected speed which (for reasons that will be explained) is considerably greater than the first-mentioned selected speed. With such return of the carriage, the assembly follows the article, with the brush working its way across the near half of the rear end side of the article.

When the traveling article has moved out of reach of the brush, the latter will have returned to the position which it had initially.

The invention thus proposes an assembly wherein a brush is conveniently carried for working its way about different sides of a traveling article, so as adequately to engage and clean these sides. Proper contact between the brush and the article at all times during a washing operation is assured by virtue of the way in which the brush is mounted for reversible compound horizontal movement in the apparatus. As will become apparent from the description which follows below, the particular construction proposed by the invention is extremely simple, and offers a high degree of reliability, as well as substantially maintenance-free operation.

Various other features and advantages offered by the invention will become apparent as the description which now follows is read in conjunction with the accompanying drawings.

DESCRIPTION OF THE DRAWINGS

FIG. 2 is a simplified fragementary schematic drawing showing certain hydraulic and electrical components used in the apparatus of FIG. 1.

Figure 1:
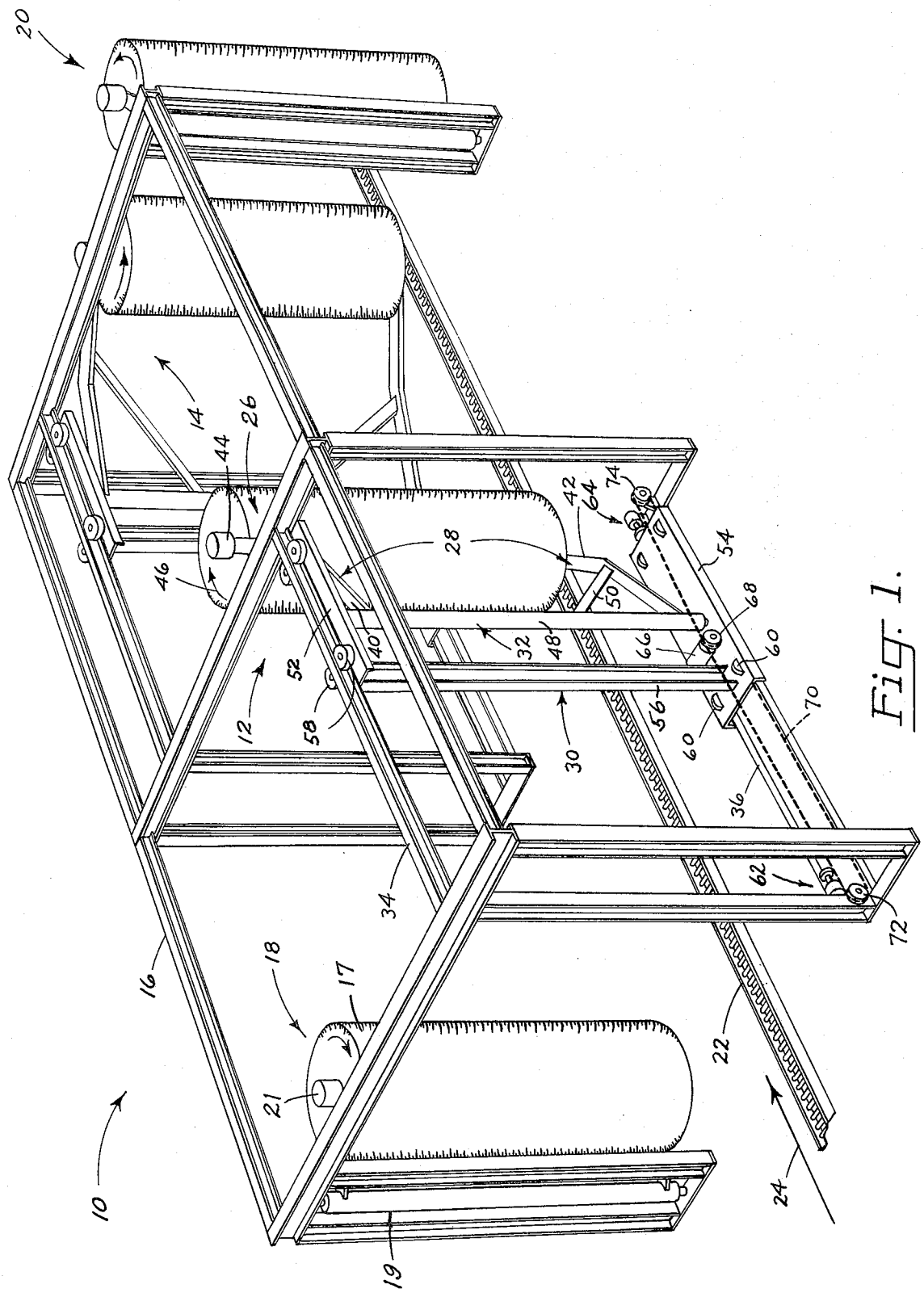
FIG. 1 is a simplified top perspective view illustrating a truck washing system which incorporates the apparatus of the invention.

And, FIGS. 3 and 4 are simplified top plan views illustrating the operation of the apparatus of the invention.

DETAILED DESCRIPTION OF THE INVENTION

Turning now to the drawings and referring first to FIG. 1, indicated generally at 10 is a truck washing system, or apparatus, which incorporates a pair of walk-about washing assemblies 12, 14 constructed in accordance with the present invention. Also included in system 10 are washing assemblies 18, 20 which are conventional. Assemblies 12, 14, 18, 20 are mounted, as will be described, on the frame 16 in the system.

The particular washing system depicted in FIG. 1 is disposed within the usual tunnel in a washing facility, through and along which truck bodies (i.e., tractors and trailers), and like vehicles, are moved during a washing operation. For moving such vehicles, system 10 includes a conventional elongated pull-chain conveyor, shown fragmentarily at 22, which extends longitudinally centrally through frame 16, and which defines an elongated substantially straight path for the transport of a vehicle through the system. It will be evident from FIG. 1 that frame 16 is system 10 straddles this conveyor. Conveyor 22 is constructed to transport a vehicle in the direction of arrow 24 in FIG. 1, and at a speed herein of about 45 feet per minute.

Further describing generally what can be seen in FIG. 1, washing assemblies 12, 14 are disposed for operation on opposite sides of conveyor 22, with assembly 12 located upstream in the system from assembly 14. In particular, assembly 12 works along the near side of the conveyor in FIG. 1, and assembly 14 along the far side of the conveyor in the figure. Similarly, washing assemblies 18, 20 are positioned to work on opposite sides of the conveyor, with assembly 18 located upstream from assembly 12, and assembly 20 located downstream from assembly 14. Assembly 18 works on the same side of the conveyor as assembly 14, and assembly 20 works on the same side as assemgly 12.

System 10 is shown in FIG. 1 in a fully operative condition awaiting a vehicle.

As was mentioned earlier, assemblies 18, 20 are conventional. Each includes an upright, cylindrical rotary brush, such as brush 17 in assembly 18, supported at a corner of frame 16 through a swing structure, such as swing structure 19, for horizontal swinging toward and away from conveyor 22. Such brushes include the usual flexible plastic "bristles" which droop when a brush is stopped, and extend substantially radially outwardly of the brush's core when the brush is rotated. The swing structures in assemblies 18, 20 are yieldably biased, as by springs, toward the conveyor. Provided for rotating each brush in these assemblies is an hydraulic motor, such as motor 21 for brush 17, suitably mounted on the swing structure carrying the brush. The motors rotate the brushes, in the directions indicated by the arrows on the brushes, at a speed of about 100 rpm. The brushes in these two assemblies, it will be evident, work on the opposite lateral sides of a vehicle traveling through the system.

Considering now the construction of washing assembly 12, this assembly includes an upright rotary brush, or washing implement, 26, and mounting means therefor including a rigid swing arm structure 28, a carriage, or carrying means, 30, and pivot means 32 pivoting arm structure 28 on carriage 30. Also forming part of the mounting means for brush 26 are two elongated rails, or track means, including an upper rail 34 and a lower rail 36 suitably joined to members in frame 16.

Brush 26 is a conventional elongated cylindrical brush, similar to the brushes used in assemblies 18, 20. The upper and lower ends of brush 26 are suitably journaled on the outer ends of upper and lower rigid arms 40, 42, respectively, which together form swing arm structure 28. Such journal connections accommodate rotation of the brush about a generally upright axis. An hydraulic motor 44 mounted adjacent the outer end of arm 40 is provided for driving brush 26. Suitable hydraulic connections (not shown) are provided for this motor which, when operating (which it is in FIG. 1), rotates brush 26 in the direction of arrow 46 at a speed of about 100 rpm.

Arms 40, 42 have the angular configuration shown (see FIGS. 3 and 4 along with FIG. 1) and have their inner ends joined as by welding to the outside of upright tube 48 which forms part of previously mentioned pivot means 32. The arms are braced against vertical deflection by means of braces, such as the brace shown at 50 for lower arm 42.

Carriage 30 includes upper and lower dollies 52, 54, respectively, rigidly interconnected by an upright column 56. The opposite ends of tube 48 are suitably journaled on dollies 52, 54 for rotation of the tube, and hence swinging of arm structure 28 and brush 26, in a horizontal plane about another upright axis substantially paralleling the rotational axis of brush 26. Carriage 30 is also referred to herein as a subframe.

Previously mentioned upper rail 34 takes the form of an I-beam positioned with its central web occupying an upright plane, and disposed with its longitudinal axis substantially paralleling that of conveyor 22. Lower rail 36 takes the form of an upwardly facing channel whose longitudinal axis also substantially parallels that of the conveyor. Upper dolly 52 is mounted for reciprocation on rail 34 through rollers, such as rollers 58, which ride in the two outwardly facing channels of rail 34. Dolly 54 is supported for movement back and forth along rail 36 through rollers, such as rollers 60 which ride in the upwardly facing channel of this rail.

Provided, and suitably anchored, adjacent the opposite ends of rail 36 are conventional spring-biased shock-absorbing bumpers 62, 64 which define the opposite limits of travel of the carriage along the rails. In system 10, carriage 30 is permitted about a 7-foot travel along the rails.

Also provided in washing assembly 12 is what is referred to herein as a reversible drive means which is operable to shift carriage 30 back and forth along rails 34, 36. Included in this drive means are a reversible hydraulic motor 66, a drive sprocket 68, a drive chain 70, and a pair of idler sprockets 72, 74.

Motor 66 is suitably mounted on lower dolly 54, with its drive shaft substantially horizontal and at a right angle to the direction in which the dolly moves along rail 36. This motor is preferably of the type commonly referred to as a "self-bypassing" motor which is continuously supplied with pressure fluid tending to rotate its drive shaft in one direction or the other, regardless of whether the drive shaft is or is not free to turn. In the context of the present invention, such a capability is desirable in simplifying the valving associated with the motor, specifically to take care of the circumstance of dolly 54 reaching one of its travel limit positions against one of the bumpers. A motor which has been found quite suitable for the purpose just indicated is an orbital hydraulic motor known as "Char-Lynn", Series K, made by Eaton Corporation, Eden Prairie, Minn.

Drive sprocket 68 is suitably anchored to the drive shaft of motor 66. Idler sprockets 72, 74 are suitably mounted for rotation at the locations shown on frame 16 adjacent the opposite ends of rail 36. Sprockets 72, 74 are disposed for rotation in substantially the same vertical plane as sprocket 68, and about axes paralleling the axis of sprocket 68. Drive chain 70 is a limited-length chain which is trained over sprocket 68, and around sprockets 72, 74 as generally shown. Opposite ends of chain 70 are attached by suitable anchors adjacent the opposite ends of dolly 54.

It will be obvious that with operation of motor 66 in one direction, the motor tends to shift carriage 30 in one direction along the rails; and vice versa. On the carriage coming to the end of its travel in either of these directions, the motor continues to operate, in a self-bypassing mode of operation, until its operation is reversed to return the carriage in the opposite direction along the rails.

As was mentioned earlier, in FIG. 1 all components in system 10, and hence in assembly 12, are shown in the positions which they occupy when awaiting an oncoming vehicle. Under these circumstances, brush 26 is substantially centered over conveyor 22, and carriage 30 is against bumper 64.

FIG. 2 in the drawings illustrates certain hydraulic and electrical components which are used in assembly 12, and which are associated with the reversible operation of motor 66. Thus, connected with the usual pair of operating ports in motor 66 are conduits 78, 80 which connect through control valves 82, 84, respectively, and conduits 86, 88, respectively, with one side of a conventional four-way valve 90. Control valves 82, 84 are substantially the same in construction—each being of the type which provides for substantially free-flow in one direction through the valve, and selectively settable restrictable flow in the opposite direction through the valve. These two valves are each arranged to provide for restricted supply of fluid through the valve to the motor, but unrestricted exhaust from the motor. For reasons which will be explained later, valves 82, 84, with respect to the particular restrictions which they impose upon the supply of fluid, are "set" differently. More specifically, these valves are so set herein that valve 84 imposes a greater restriction on fluid supply than does valve 82. Commercially available valves which have been found suitable for the purpose just discussed are control valves known as " Pneu-Trol" valves, No. F-20B, made by Deltrol Corporation, Bellwood, Ill.

Four-way valve 90 in FIG. 2 is depicted by means of a schematic showing of its valve spool which is represented as an elongated upright rectangle divided into two squares, wherein arrows indicate the direction of fluid flow permitted. The opposite side of valve 90 from that previously mentioned is connected to conduits 92, 94. Conduit 92 connects with a suitable supply of hydraulic fluid under pressure, and conduit 94 is connected with a suitable reservoir of such fluid. Thus, conduit 92 constitutes a supply conduit, and conduit 94 an exhaust conduit.

The valve spool in valve 90 is shown with flow taking place therethrough as indicated by the arrows in the upper block in the spool. Hence, pressure fluid is supplied motor 66 through conduits 86, 78 and valve 82, with fluid exhausting through conduits 80, 88 and valve 84. Such fluid flow drives motor 66 in what will be referred to herein as a forward direction, which tends to shift carriage 30 along rails 34, 36 toward bumper 64. With the spool in valve 90 shifted to produce flow as indicated by the arrows in the lower block in the spool, motor 66 operates in the reverse direction, tending to shift the carriage toward bumper 62.

Valve 82 is so set, with respect to the restriction that it imposes on fluid supplied the motor through it, that forwarddirection operation of the motor moves the carriage at a speed of about 90 feet per minute. On the other hand, valve 84 is so set, that with fluid supplied through it to operate the motor in the reverse direction, the motor shifts the carriage at the considerably lower speed of about 25 feet per minute.

The position of the spool in valve 90 is changed through the operation of a bidirectionally operable solenoid 96. The usual pair of windings in solenoid 96 are connected jointly to a grounded conductor 98, and independently to conductors 100, 102. Conductors 100, 102 are connected to the two terminals in a conventional snap-action, single-pole, double-throw switch 104 whose wiper is connected through a conductor 106 to a suitable source of positive voltage. Switch 104 is suitably mounted on dolly 54 adjacent the base of tube 48.

With the wiper in switch 104 in the position shown in FIG. 2 supplying voltage to conductor 102, the solenoid places the spool in valve 90 in the position shown for it in this figure—with flow, accordingly, taking place as indicated by the upper block in the spool. With the wiper in the switch supplying a voltage to the solenoid through conductor 100, the spool in valve 90 is shifted to produce flow as indicated by the lower block in the spool.

As contemplated by the present invention, switch 104 in assembly 12 forms part of what is called a sensor means in the assembly, which means further includes a radial projection 108 mounted on the outside of the base of tube 48, and a paddle 110 suitably connected to the wiper in the switch. Projection 108 and paddle 110 are reversibly engageable with one another with turning of tube 48—thus to "sense" the angular position of arm structure 28 and brush 26.

In FIG. 2, tube 48 and paddle 108 are shown in the angular positions which they have when arm structure 28 and brush 26 occupy the positions shown for them in FIG. 1. It will be recalled that these are the positions which these components have prior to brush 26 engaging an oncoming vehicle. Under such circumstances, paddle 110 and the wiper in switch 104 occupy the positions shown for them in FIG. 2—a condition which has previously resulted in placement of the spool in valve 90 so as to produce fluid flow as indicated by the upper block in the spool.

With outward swinging of the brush and arm structure, and consequent rotation of tube 48 in a clockwise direction in FIG. 2, and with this swinging taking place through an angle of about 90°, projection 108 engages paddle 110, and with slight continued clockwise turning of tube 48, causes snap-action switching in switch 104, whereupon its wiper supplies voltage to the solenoid through conductor 100. On this occurring, of course, the spool in valve 90 switches positions, reversing the direction of operation of motor 66, with carriage 30 then shifting along rails 34, 36 rearwardly toward bumper 62. Such swinging of the arm structure results in projection 108 moving clockwise slightly past paddle 110.

With reverse swinging occurring in the brush and swing arm, which swinging takes place as the brush clears the rear corner of a vehicle, projection 108 again engages paddle 110—this time returning the wiper in switch 104 to the position in which it is shown in FIG. 2. Only a slight reverse swing in these components is necessary to effect such action. Thereupon, motor 66 again operates in a forward direction—returning the carriage forwardly along rails 34, 36 toward bumper 64.

Because the scale of switch 104, projection 108, and paddle 110 is so small in comparison with the scale of parts shown in FIG. 1, these components have been omitted from FIG. 1, and are shown only in FIG. 2.

Washing apparatus 14 in the system is substantially identical to, though the mirror image of, washing apparatus 12. The presence of components in assembly 14 corresponding to those in assembly 12 will be apparent from an examination of FIG. 1 in the drawings. FIG. 1 also shows the parts in assembly 14 in the positions which they have when awaiting an oncoming vehicle.

Turning now to FIGS. 3 and 4, these illustrate the operation of assembly 12. Referring first to FIG. 3, brush 26, arm structure 28 and carriage 30 are shown in solid outline in the respective positions which they have upon just being engaged by the front end of an oncoming vehicle (shown in solid outline at 112)—the same positions (described earlier) in which they are shown in FIG. 1. Following engagement of the brush and the front end of vehicle 112, and with continued forward movement of the vehicle toward the position shown therefor in dash-dot outline at 112A, the brush and swing arm structure swing outwardly toward their dash-dot outline positions. This swinging, of course, results from engagement between the brush and the vehicle. As such swinging occurs, it will be apparent that the brush works its way across the near half of the front end side of the vehicle, cleaning the same.

During such operation, carriage 30 is stationary in system 10, with vehicle 112 traveling forwardly with respect to the carriage at the relative forward speed of 45 feet per minute.

On the swing arm and brush reaching such dash-dot outline positions, projection 108 engages paddle 110 to effect reversing of motor 66, whereupon carriage 30 moves to the left in FIG. 3 toward bumper 62. With such movement of the carriage, and continued advancement of vehicle 112 toward its dashed outline position shown at 112B, the brush and arm structure swing slightly further outwardly toward the respective positions shown therefor also in dashed outline in FIG. 3.

With carriage 30 now moving in the system, at the speed (mentioned earlier) of 25 feet per minute, vehicle 112 moves forwardly with respect to the carriage and brush at the relative forward speed of 70 feet per minute.

Thus, and with continued advancement of the vehicle, the brush works its way rearwardly along the adjacent lateral side of the vehicle. This situation remains until the brush and the rear corner of the vehicle are disposed adjacent one another. Depending upon the length of the vehicle, when this latter situation develops carriage 30 may or may not yet have reached bumper 62. If it has, the carriage will have stopped, with motor 66 continuing to operate in a self-bypassing mode of operation. Regardless, however, whether carriage 30 has reached the rear limit of its travel, the operation which follows brush 26 reaching the vehicle's rear corner is unaffected.

Referring to FIG. 4, carriage 30, swing arm structure 28 and brush 26 are shown in solid outline in the respective positions which they have (whether or not the carriage has reached bumper 62) on the brush just clearing the rear corner of the vehicle. In dashed outline, they are shown in the relative positions which they have just prior to having so cleared the vehicle's corner. It has been assumed herein, and for the purpose of FIG. 4, that the carriage as shown in dashed outline has not yet reached bumper 62. On arm structure 28 and brush 26 swinging from their dashed outline to their solid outline positions, projection 108 reengages paddle 110 to effect a return in motor 66 of a forward direction of operation. And, on this occurring, the carriage is returned along the rails toward bumper 64, with brush 26 following the curved path indicated, and swinging inwardly to work its way inwardly across the near half of the rear end side of the vehicle. Forward travel of the carriage in the system is at 90 feet per minute. Hence, under such circumstances, vehicle 112 moves relative to the carriage at the rearward speed of 45 feet per minute. Such return movement of the carriage maintains continuous contact between the brush and the rear end side of the vehicle, and results in the brush working its way (half-way) across such side.

The final positions reached by the various parts in assembly 12 are shown in dash-dot outline in FIG. 4, with carriage 30 against bumper 64, and the brush just about to disengage the vehicle. The washing apparatus is now in a condition to engage the lead end of the next oncoming vehicle.

The operation of washing assembly 14 is essentially the same as that just described for assembly 12.

It will thus be apparent that the unique compound horizontal movement (reversible swinging and reversible translation) provided for a washing implement according to the invention, enables such an implement to walk about the end and lateral sides of an article to accomplish thorough washing thereof. The combination of the rigid swing arm structure for an implement, and the reciprocable carriage which carries the arm structure, offers a simple, reliable, effective construction enabling proper movement of the implement.

With the carriage in a washing assembly having the same (though reversed) relative travel speed with respect to a vehicle during swinging of an implement across the vehicle's opposite ends, the washing action produced by the implement on such ends is essentially the same. The differential movement speeds contemplated for a carriage, and mentioned above, assure such action.

Obviously, apparatus as proposed by the invention can be used with a wide variety of articles, and a wide variety of washing systems. Power other than hydraulic power may be used for motors. Further, sensor means to perform as above described may be constructed in many ways.

It should also be borne in mind that the specific travel speeds and dimensions given herein are not limiting factors in the invention. Obvious variations may be made.

Thus, while a preferred embodiment of the invention has been described, it is appreciated that modifications may be made without departing from the spirit of the invention.

It is claimed and desired to secure by Letters Patent is:

1. In apparatus for washing an article, such as a vehicle or the like, which article moves in the apparatus in a given direction along a path,
   a washing implement for engaging different upright sides of such an article as the same travels along said path,
   means mounting said implement for limited compound horizontal movement relative to said path, said mounting means comprising a swing arm structure supporting said implement for reversible horizontal swinging of the implement toward and away from said path, such swinging resulting from engagement of the implement with an article moving along the path, and carriage means for said swing arm structure accommodating reversible horizontal translation of the implement along a line substantially paralleling said path, such swinging and translation being producible independently of each other, reversible power-operated drive means for driving said carriage means and producing said reversible translation in accordance with the angular position of said swing arm structure relative to said path, and sensor means mounted on said carriage means and operatively coupled to said drive means for sensing said angular position and, in accordance therewith, for instructing said drive means as to which direction to drive said carriage means.

2. The apparatus of claim 1, wherein said swing arm structure is a rigid construction.

3. The apparatus of claim 1, wherein said washing implement and mounting means are positioned to operate along one side of said path, and which further comprises another washing implement and mounting means like said first-mentioned washing implement and mounting means, but substantially the mirror image thereof, positioned for operation along the opposite side of said path at a point displaced along the path from the first-mentioned washing implement and mounting means.

4. In apparatus for washing an article, such as a vehicle or the like, which article moves in the apparatus in a given direction along a path, a washing implement for engaging different upright sides of such an article as the same travels along said path, pivot means supporting said implement adjacent said path for swinging in a substantially horizontal plane toward and away from the path, means carrying said pivot means for limited reciprocal movement thereof along a line substantially paralleling said path, reversible, power-operated drive means operatively connected to said carrying means for reversibly driving the same, and sensor means operatively connected both to said pivot means and to said drive means for determining the direction of operation of the latter in accordance with the angular position of the former.

5. The apparatus of claim 4, wherein said sensor means include a switch having one position effective to cause operation of said drive means in one direction to shift the carrying means in the direction opposite said given direction, and another position effective to cause the reverse operation, swinging of said implement away from said path toward one lateral position relative thereto causing placement of said switch in its said one position, and swinging of the implement in the opposite direction away from said one lateral position toward another lateral position relative to said path causing placement of the switch in its said other position.

6. The apparatus of claim 4, wherein said washing implement, pivot means, and carrying means are positioned for operation along one side of said path, and which further comprises another washing implement, pivot means, and carrying means like the corresponding first-mentioned components, but substantially the mirror image thereof, positioned for operation along the opposite side of said path at a point displaced along the path from the first-mentioned components.

7. In apparatus for washing an article, such as a vehicle or the like, which article moves in the apparatus in a given direction along a path, an upright rotary brush for engaging different upright sides of an article as the same travels along said path, a substantially rigid swing arm structure supporting said brush, and pivot means mounting said swing arm structure adjacent said path for swinging of the structure and the brush in a generally horizontal plane toward and away from the path, elonganted track means disposed adjacent said path and substantially paralleling the same, carriage means supporting said pivot means for limited reciprocation along said track means, reversible, power-operated drive means drivingly connected to said carriage means for shifting the same alternately back and forth along said track means, and sensor means operatively connected both to said swing arm structure and to said drive means for determining the direction of operation of the latter in accordance with the angular position of the former.

8. The apparatus of claim 7, wherein said sensor means includes a switch having one position effective to cause operation of said drive means in one direction to shift the carriage means in the direction opposite said given direction, and another position effective to cause the reverse operation, swinging of said implement away from said path toward one lateral position relative thereto causing placement of said switch in its said one position, and swinging of the implement in the opposite direction away from said one lateral position toward another lateral position relative to said path causing placement of the switch in its said other position.

9. The apparatus of claim 7, wherein the components of said apparatus are positioned for operation along one side of said path, and which further comprises another set of like, but substantially mirror image, components positioned for operation along the opposite side of said path and located at a point displaced along the path.

10. In apparatus for washing an article, such as a vehicle or the like, which article moves in the apparatus in a given direction along a path, a washing implement for engaging different upright sides of such an article as the same travels along said path, pivot means supporting said implement adjacent said path for swinging in a substantially horizontal plane toward and away from the path, means carrying said pivot means for limited reciprocal movement thereof along a line substantially paralleling said path, reversible power-operated drive means operatively connected to said carrying means for reversibly driving the same, and sensor means operatively connected both to said pivot means and to said drive means for determining the direction of operation of the latter in accordance with the angular position of the former, said sensor means including a switch having one position effective to cause operation of said drive means in said one direction to shift the carrying means at one selected speed in the direction opposite said given direction, and another position effective to cause the reverse operation with the carrying means in such reverse operation being shifted at another selected speed which exceeds said one selected speed, swinging of said implement away from said path toward one lateral position relative thereto causing placement of said switch in its said one position, and swinging of the implement in the opposite direction away from said one lateral position toward another lateral position relative to said path causing placement of the switch in its said other position.

* * * * *